United States Patent [19]

Mehta et al.

[11] Patent Number: 5,968,255
[45] Date of Patent: Oct. 19, 1999

[54] UNIVERSAL WELL CEMENT ADDITIVES AND METHODS

[75] Inventors: Sudhir Mehta; Richard R. Jones, both of Plano, Tex.; William J. Caveny, Rush Springs, Okla.; Rickey L. Morgan; Dennis W. Gray, both of Comanche, Okla.; Jiten Chatterji, Duncan, Okla.

[73] Assignees: Halliburton Energy Services, Inc., Duncan, Okla.; Atlantic Richfield Company, Plano, Tex.

[21] Appl. No.: 09/228,846

[22] Filed: Jan. 12, 1999

Related U.S. Application Data

[63] Continuation-in-part of application No. 09/013,791, Jan. 26, 1998, which is a continuation-in-part of application No. 08/834,065, Apr. 14, 1997, Pat. No. 5,749,418.

[51] Int. Cl.$^6$ .......................... C04B 22/12; C04B 24/00; E21B 33/14

[52] U.S. Cl. .......................... 106/724; 106/725; 106/728; 106/730; 106/734; 106/736; 106/802; 106/805; 106/809; 106/810; 106/815; 106/816; 166/292; 166/293

[58] Field of Search .................................... 106/734, 736, 106/815, 724, 725, 728, 730, 802, 805, 809, 810, 816; 166/292, 293

[56] References Cited

U.S. PATENT DOCUMENTS

| | | | |
|---|---|---|---|
| 3,483,007 | 12/1969 | Hook | 106/93 |
| 3,663,287 | 5/1972 | Mizunuma et al. | 106/315 |
| 3,887,009 | 6/1975 | Miller et al. | 166/292 |
| 4,045,236 | 8/1977 | Bianchi | 106/88 |
| 4,132,558 | 1/1979 | Uchikawa et al. | 106/104 |
| 4,160,674 | 7/1979 | Sawyer | 106/89 |
| 4,444,593 | 4/1984 | Schutz | 106/89 |
| 4,557,763 | 12/1985 | George et al. | 106/90 |
| 4,761,183 | 8/1988 | Clarke | 106/117 |
| 5,387,740 | 2/1995 | Sasae et al. | 588/257 |
| 5,397,516 | 3/1995 | Sikaffy | 264/42 |
| 5,512,096 | 4/1996 | Krause | 106/718 |
| 5,547,024 | 8/1996 | Di Lullo Arias | 166/292 |
| 5,571,318 | 11/1996 | Griffith et al. | 106/725 |
| 5,749,418 | 5/1998 | Mehta et al. | 106/734 |

FOREIGN PATENT DOCUMENTS

| | | | |
|---|---|---|---|
| 53-012929 | 7/1976 | Japan . | |
| 0814927 | 3/1979 | U.S.S.R. . | |
| 785463 | 12/1980 | U.S.S.R. | E21B 33/138 |
| 2 080 812 | 2/1982 | United Kingdom | C08B 11/00 |
| 2 156 801 | 10/1985 | United Kingdom | C04B 24/30 |
| WO 98/46542 | 10/1998 | WIPO | C04B 22/12 |

OTHER PUBLICATIONS

WPIDS Abstract No. 96–0199218 (Sep. 1995).
WPIDS Abstract No. 93–402468 (Nov. 1992).
Chemical Abstract No. 90:173527 (1977) No Month.
Chemical Abstract No. 116:179840 (Oct. 1991).
Chemical Abstract No. 78:33390 (1972) No Month.
Chemical Abstract No. 93:12385 (Feb. 1980).
Chemical Abstract No. 108:61453 (Oct. 1987).
Chemical Abstract No. 70:60504 (1968) No Month.
Chemical Abstract No. 75:9537 (1970) No Month.
Chemical Abstract No. 84:78711 (1975) No Month.
Derwent Publications, Ltd., London, GB; Abstract No. XP–002072598, abstract of Soviet Union Patent. Specification No. 1776761 (Nov. 1992).
Derwent Publications, Ltd., London, GB; Abstract No. XP–002072597, abstract of Soviet Union Patent Specification No. 785463 (Dec. 1980).
Derwent Publications, Ltd., London, GB; Abstract No. XP–002072599, abstract of Soviet Union Patent Specification No. 1432194 (Oct. 1988).
Derwent Publications, Ltd., London, GB; Abstract No. XP–002072600, abstract of Russian Patent Specification No. 1091616 (Sep. 1995).
Derwent Publications, Ltd., London, GB; Abstract No. XP–002072596, abstract of an article by Bushtedt entitled "Use of Iron Chlorides . . . Concretes" (1963) No Month.

*Primary Examiner*—Anthony Green
*Attorney, Agent, or Firm*—Craig W. Roddy; C. Clark Dougherty, Jr.

[57] ABSTRACT

The present invention provides universal well cement additives and methods. The universal well cement additives improve the properties of a well cement slurry and can be comprised of iron chloride, a dispersing agent, an organic acid, a hydratable polymer and an ultra-fine particulate hydraulic cement.

34 Claims, No Drawings

UNIVERSAL WELL CEMENT ADDITIVES AND METHODS

RELATED PATENT APPLICATION DATA

This application is a continuation-in-part of application Ser. No. 09/013,791 filed Jan. 26, 1998 which is a continuation-in-part of application Ser. No. 08/834,065 filed Apr. 14, 1997, now U.S. Pat. No. 5,749,418 issued May 12, 1998.

BACKGROUND OF THE INVENTION

1. Field of the Invention

The present invention relates generally to well cement additives, and more particularly, to universal composite additives for improving the properties of well cement slurries.

2. Description of the Prior Art

Hydraulic cement slurries used for cementing subterranean formations or zones in oil and gas wells must have particular properties. For example, the slurries must have properties such that they are capable of being mixed and pumped without prematurely gelling, have sufficiently long pumping times to be placed in subterranean formations or zones, have sufficiently high compressive strengths after setting, and have good fluid loss control.

The American Petroleum Institute (API) has set standards for different classes of oil well cements to insure that the cement slurries formed with them have required properties. The API cements are Portland cements and because of the strict requirements placed on them, they are more difficult to produce and more expensive than the many construction grade cements used for constructing bridges, roads, buildings and the like on the earth's surface.

Surface construction grade cements are commonly available from a variety of manufacturers throughout the world and are very inexpensive as compared to API Portland cements and other comparable cements used in cementing oil and gas wells. The construction grade cements typically contain high quantities of metal sulfates while the cements used in oil well cementing must have relatively low metal sulfate contents.

While cement slurries formed from inexpensive surface construction grade cements are suitable for a large number of surface applications, they do not have the properties required for subterranean oil and gas well cementing such as consistent viscosities, suitable thickening times, high compressive strengths after setting, good fluid loss control and the like. The chemical compositions, and particularly the metal sulfate concentrations, of surface construction grade cements vary from manufacturer to manufacturer making it impossible to predict the properties of cement slurries containing such cements. Thus, there is a need for a universal additive for improving the properties of inexpensive surface construction grade cement slurries whereby the slurries can be used in oil and gas well cementing applications.

A number of low quality oil and gas well cements which are available and used throughout the world also contain high metal sulfate concentrations and/or otherwise lack some of the properties required. For example, such low quality oil and gas well cements often have poor rheology, marginal strength development or poor response to conventional additives. Thus, there is also a need for a universal additive that can be utilized to improve the properties of presently used low quality oil and gas well cements.

SUMMARY OF THE INVENTION

The present invention provides universal composite particulate solid additives for improving the properties of well cement slurries which meet the needs described above and overcome the deficiencies of the prior art. When added to a surface construction grade or presently used oil and gas well grade hydraulic cement slurry, an additive of this invention simultaneously improves the viscosity, thickening time, after setting compressive strength, fluid loss control and other properties of the slurry to those which are particularly suitable for cementing oil and gas wells.

The universal additives of this invention are comprised of iron chloride selected from the group of ferrous chloride, ferric chloride and mixtures thereof present in an amount in the range of from about 0.5 to about 30 parts by weight, a dispersing agent present in an amount in the range of from about 1 to about 20 parts by weight, an organic acid present in an amount in the range of from about 0.01 to about 10 parts by weight, a hydratable polymer present in an amount in the range of from about 1 to about 20 parts by weight and an ultra-fine particulate hydraulic cement present in an amount in the range of from about 1 to about 50 parts by weight. Other components which can optionally be included in the additive are a defoaming agent, an alkaline earth metal halide and one or more other agents for increasing the set cement compressive strength.

Additional universal additives of this invention are comprised of iron chloride selected from the group of ferrous chloride, ferric chloride and mixtures thereof present in an amount in the range of from about 0.5 to about 30 parts by weight, an alkali or alkaline-earth metal halide, preferably chloride, present in an amount in the range of from about 5 to about 60 parts by weight, an organic acid present in an amount in the range of from about 0.01 to about 10 parts by weight and a hydratable polymer present in an amount in the range of from about 1 to about 50 parts by weight. Other components which are also preferably included in the additive are a defoaming agent, a dispersing agent, ultra-fine particle size hydraulic cement and other agents for increasing the set cement compressive strength.

The methods of this invention for improving the properties of a cement slurry comprised of a surface construction grade or better hydraulic cement and water comprise combining a universal additive of the present invention with the cement slurry in an amount in the range of from about 0.1% to about 30% by weight of the hydraulic cement in the slurry, the universal additive being comprised of iron chloride selected from the group of ferrous chloride, ferric chloride and mixtures thereof, a dispersing agent, an organic acid, a hydratable polymer and an ultra-fine particulate cement.

Additional methods of this invention for improving the properties of a cement slurry comprised of a surface construction grade or better hydraulic cement and water comprise combining a universal additive of the present invention with the cement slurry in an amount in the range of from about 0.1% to about 30% by weight of the hydraulic cement in the slurry, the universal additive being comprised of iron chloride selected from the group of ferrous chloride, ferric chloride and mixtures thereof, an alkali or alkaline-earth metal halide, an organic acid, and a hydratable polymer.

Methods of cementing a subterranean zone penetrated by a well bore utilizing a cement slurry comprised of a surface construction grade or better hydraulic cement and water are also provided by the present invention. The methods comprise the steps of combining a universal additive of this invention as described above with the cement slurry in an amount in the range of from about 0.1% to about 30% by weight of the hydraulic cement in the slurry, pumping the cement slurry containing the additive into the subterranean zone to be cemented by way of the well bore and then allowing the cement slurry to set into a hard impermeable mass therein.

It is, therefore, a general object of the present invention to provide universal well cement additives and methods of using the additives.

Other and further objects, features and advantages of the present invention will be readily apparent to those skilled in the art upon a reading of the description of the preferred embodiments which follows.

DESCRIPTION OF PREFERRED EMBODIMENTS

As mentioned above, construction grade cements for use in surface applications and low quality oil and gas well cements are readily available from a variety of manufacturers around the world and are very inexpensive as compared to the high quality API cements often used in cementing oil and gas wells. The surface construction grade and low quality oil and gas well cements typically contain high quantities of alkali and/or alkaline-earth metal sulfates, i.e., from about 0.75% to about 3.0% of such metal sulfates by weight of the cement. High quality API oil and gas well cements typically contain less than about 0.3% of such metal sulfates by weight of the cement. The presence of the high amounts of metal sulfates in the cements causes the cements to have varying and erratic properties such as thickening time and compressive strength when slurried in water.

The present invention provides single universally applicable particulate solid additives which contain mixtures of components that react synergistically with cement slurries to optimize the properties of the cement slurries and their performance in cementing oil and gas wells. The additives are not only useful in improving the properties and performance of surface construction grade and low quality oil and gas well cement slurries, but they also improve the properties and performance of other well cements including those meeting API standards. The additives are particularly useful in improving the properties of cements available in remote locations throughout the world whereby the cements can be effectively utilized in oil and gas well cementing.

The four basic properties of a cement slurry which the additives of the present invention improve to make the cement slurry suitable for oil and gas well cementing are viscosity (also referred to as rheology), thickening time, after setting compressive strength and fluid loss control. As mentioned, the additives of this invention are universally applicable to cement slurries formed with low quality high sulfate content cements as well as those formed with higher quality cements. The additives can be used to improve the properties of cement slurries which are to be subjected to temperatures up to about 230° F. and which have densities in the range of from about 12 to about 17 pounds per gallon.

The universal additives of this invention are basically comprised of iron chloride selected from the group of ferrous chloride, ferric chloride and mixtures thereof present in an amount in the range of from about 0.5 to about 30 parts by weight, a dispersing agent present in an amount in the range of from about 1 to about 20 parts by weight, an organic acid present in an amount in the range of from about 0.01 to about 10 parts by weight, a viscosity increasing hydratable polymer present in an amount in the range of from about 1 to about 20 parts by weight and an ultra-fine particulate hydraulic cement present in an amount in the range of from about 1 to about 50 parts by weight.

As indicated above, the iron chloride can be ferrous chloride, ferric chloride or mixtures thereof. The iron chloride functions synergistically with the other components of the additive to overcome the effect of a high metal sulfate concentration in a cement and to shorten the thickening time of a slurry of the cement to an acceptable range. That is, the iron chloride in combination with the other components of the additive causes the cement to hydrate in a normal and predictable manner. Also, the iron chloride contributes to improving the compressive strength of the cement slurry after it sets.

The dispersing agent in the additive helps control the rheology of the cement slurry and contributes to making the slurry a stable suspension over a broad density range. While various dispersing agents can be utilized, a particularly suitable dispersing agent is the condensation polymer product of an aliphatic ketone, e.g., acetone, an aliphatic aldehyde, e.g., formaldehyde, and a compound which introduces acid groups into the polymer, e.g., sodium sulfite. Such a dispersing agent is described in U.S. Pat. No. 4,557,763 issued to George et al. on Dec. 10, 1985, which is incorporated herein by reference, and is commercially available under the trade designation "CFR-3™" from Halliburton Energy Services of Duncan, Okla.

The organic acid in the additive controls the viscosity of the cement slurry, i.e., it prevents the premature gelation of the slurry and improves the rheology of the slurry over a broad density range. Various organic acids can be utilized in the additive including, but not limited to, tartaric acid, citric acid, gluconic acid, oleic acid, phosphoric acid and uric acid. Of these, tartaric acid is preferred.

A variety of viscosity increasing hydratable polymers can also be utilized in the additive including, but not limited to, carboxymethylcellulose, hydroxyethylcellulose, carboxymethylhydroxyethylcellulose, vinyl sulfonated polymers, hydratable graft polymers and other hydratable polymers known to those skilled in the art. Of these, hydroxyethylcellulose is preferred. The hydratable polymer utilized adds viscosity to the cement slurry and functions to reduce fluid loss from the slurry.

The ultra-fine particulate hydraulic cement in the additive preferably has a maximum particle size of about 15 microns and a specific surface area of about 12,000 square centimeters per gram. The distribution of the various size particles within the ultra-fine cement is preferably such that about 90% of the particles have diameters no greater than about 10 microns, 50% have diameters no greater than about 5 microns, and 20% of the particles have diameters no greater than about 3 microns. The specific surface area of the ultra-fine hydraulic cement (sometimes also referred to as Blaine fineness) is an indication of the ability of the cement to chemically interact with other materials. The specific surface area is preferably greater than about 12,000 square centimeters per gram, and more preferably, greater than about 13,000 square centimeters per gram.

Ultra-fine cements having maximum particle sizes and surface areas as set out above are disclosed in various prior U.S. patents including U.S. Pat. No. 4,761,183 issued to Clarke during August 1988 which discloses ultra-fine particle size cements formed of slag and mixtures thereof with Portland cement and U.S. Pat. No. 4,160,674 issued to Sawyer during July 1979 which discloses ultra-fine particle size Portland cements, both of which are incorporated herein by reference. The ultra-fine hydraulic cement preferred for use in accordance with this invention is Portland cement. Such a cement is commercially available under the trade designation "MICRO-MATRIX™" from Capitol Cement Co. of San Antonio, Tex. The presence of the ultra-fine cement in the cement slurry adds compressive strength to the cement slurry after it sets and contributes to shortening the thickening time of the cement slurry to a preferred range.

As indicated above, the additive can also include a number of other components which provide improved properties to a cement slurry. That is, the additive can include a defoaming agent such as polydimethylsiloxane present in the additive in an amount in the range of from about 0.01 to about 5 parts by weight. Such a defoaming agent is commercially available under the trade name "D-AIR™" from Halliburton Energy Services of Duncan, Okla. The defoaming agent prevents a cement slurry containing the additive from excessively foaming during mixing and pumping.

Another component which can be included in the additive is an alkali or alkaline-earth metal halide which functions with the iron chloride to overcome the effect of high metal sulfate concentration. Preferred such compounds are calcium chloride, sodium chloride, potassium chloride and ammonium chloride, with calcium chloride being the most preferred. When used, the alkali or alkaline earth metal halide is generally included in the additive in an amount in the range of from about 5 to about 20 parts by weight.

Still another component which can be included in the additive is a particulate ASTM Type III cement which contributes to increasing the after setting compressive strength of the cement slurry and decreasing the thickening time of the slurry. Such a cement is commercially available under the trade designation "TXI III™" from Texas Industries, Inc. of Midlothian, Tex. When used, the ASTM Type III cement is generally included in the additive in an amount in the range of from about 1 part to about 50 parts by weight.

Yet another component which can be included in the additive is a particulate silica such as fumed silica or ultra-fine silica. The silica functions in a cement slurry to prevent after setting compressive strength retrogression in hot wells. When used, the silica is preferably included in the additive in an amount in the range of from about 0.1 to about 50 parts by weight.

A preferred universal particulate solid additive of this invention for improving the properties of a cement slurry is comprised of iron chloride selected from the group of ferrous chloride, ferric chloride and mixtures thereof present in an amount of about 10 parts by weight, a dispersing agent comprised of the condensation polymer product of acetone, formaldehyde and sodium sulfite present in an amount of about 13 parts by weight, tartaric acid present in an amount of about 0.4 parts by weight, hydroxyethylcellulose present in an amount of about 2 parts by weight and an ultra-fine particulate hydraulic cement having a maximum particle size of about 15 microns and a specific surface of about 12,000 square centimeters per gram present in an amount of about 8 parts by weight.

Additional universal additives of this invention are basically comprised of iron chloride selected from the group of ferrous chloride, ferric chloride and mixtures thereof present in an amount in the range of from about 0.5 to about 30 parts by weight, an alkaline-earth metal halide, preferably chloride, present in an amount in the range of from about 5 to about 60 parts by weight, an organic acid present in an amount in the range of from about 0.01 to about 10 parts by weight, and a viscosity increasing hydratable polymer present in an amount in the range of from about 1% to about 50% by weight.

As indicated above, the iron chloride can be ferrous chloride, ferric chloride or mixtures thereof. The iron chloride functions synergistically with the alkali or alkaline-earth metal halide and other components of the additive to overcome the effect of a high metal sulfate concentration in a cement and to shorten the thickening time of a slurry of the cement to an acceptable range. That is, the iron chloride in combination with the alkali or alkaline-earth metal halide and other components of the additive cause the cement to hydrate in a normal and predictable manner.

A variety of alkali or alkaline-earth metal halides can be utilized in the additive which function synergistically with the iron chloride as described above. Preferred such compounds are calcium chloride, sodium chloride, potassium chloride and ammonium chloride, with calcium chloride being the most preferred.

The organic acid in the additive controls the viscosity of the cement slurry, i.e., it prevents the premature gelation of the slurry and improves the rheology of the slurry over a broad density range. Various organic acids can be utilized in the additive including, but not limited to, tartaric acid, citric acid, gluconic acid, oleic acid, phosphoric acid and uric acid. Of these, tartaric acid is preferred.

A variety of viscosity increasing hydratable polymers can also be utilized in the additive including, but not limited to, carboxymethylcellulose, hydroxyethylcellulose, carboxymethylhydroxyethylcellulose, vinyl sulfonated polymers, hydratable graft polymers and other hydratable polymers known to those skilled in the art. Of these, hydroxyethylcellulose is preferred. The hydratable polymer utilized adds viscosity to the cement slurry and functions to reduce fluid loss from the slurry.

As indicated above, the additive preferably also includes a number of other components which provide improved properties to a cement slurry. That is, the additive preferably also includes a defoaming agent such as polydimethylsiloxane present in the additive in an amount in the range of from about 0.01 to about 5 parts by weight, a dispersing agent as described above in an amount in the range of from about 1 to about 20 parts by weight, an ultra-fine particulate hydraulic cement in an amount in the range of from about 1 to about 50 parts by weight, an ASTM Type III cement as described above in an amount in the range of from about 1 part to about 50 parts by weight and fumed or ultra-fine silica in an amount in the range of from about 0.1 to about 50 parts by weight.

Another preferred universal particulate solid additive of this invention for improving the properties of a cement slurry is comprised of iron chloride selected from the group of ferrous chloride, ferric chloride and mixtures thereof present in an amount of about 10 parts by weight, calcium chloride present in an amount of about 14 parts by weight, tartaric acid present in an amount of about 0.3 parts by weight, hydroxyethylcellulose present in an amount of about 12 parts by weight, a defoaming agent comprised of polydimethylsiloxane present in an amount of about 0.3 parts by weight, a dispersing agent comprised of the condensation polymer product of acetone, formaldehyde and sodium sulfite present in an amount of about 11 parts by weight, an ultra-fine particulate hydraulic cement having a maximum particle size of about 15 microns and a specific surface of about 12,000 square centimeters per gram present in an amount of about 8 parts by weight, a particulate ASTM Type III cement present in an amount of about 8 parts by weight and fumed silica present in an amount of about 8 parts by weight.

The additives of this invention can be mixed with a cement slurry using various techniques known to those skilled in the art. A particularly suitable technique is to combine the additive used with the water utilized in a mixer followed by the hydraulic cement used.

The present invention also provides methods of converting the viscosity, thickening time, after setting compressive strength, fluid loss and other properties of a cement slurry comprised of a surface construction grade or better hydraulic cement and water to those properties which are particularly suitable for cementing oil and gas wells. Such methods basically comprise combining a universal particulate solid additive of this invention as described above with the construction grade or better cement slurry in an amount in the range of from about 0.1% to about 30% by weight of the cement in the slurry. As described above, the resulting cement slurry containing the additive has properties particularly suitable for use in cementing oil and gas wells.

Additional methods are provided by the present invention for cementing a subterranean zone penetrated by a well bore. The subterranean zone can have a static temperature of up to about 230° F. and the construction grade or better cement slurry utilized can have a density in the range of from about 12 to 17 pounds per gallon. In accordance with the methods, a universal particulate solid additive of this invention is combined with the construction grade or better cement slurry in an amount in the range of from about 0.1% to about 30% by weight of the cement in the slurry. The resulting cement slurry having improved properties is pumped into the subterranean zone to be cemented by way of the well bore penetrating it and the cement slurry is then allowed to set into a hard impermeable mass in the zone.

In order to further illustrate the universal additives and methods of this invention, the following examples are given.

EXAMPLE 1

A variety of cement slurries having various densities and utilizing various API hydraulic cements, fresh water or salt water and various quantities of a universal additive of this invention were prepared. The slurries were tested for thickening time, fluid loss, rheology (plastic viscosity/yield point), compressive strengths and shear bond strengths at various temperatures. The tests were run in accordance with the procedures set forth in the *API Specification For Materials And Testing For Well Cements*, API Specification 10, 5th Edition, dated Jul. 1, 1990, of the American Petroleum Institute.

The universal additive utilized in the tests was comprised of 10 parts by weight ferric chloride, 13 parts by weight of a dispersing agent comprised of the condensation polymer product of acetone, formaldehyde and sodium sulfite, 0.4 parts by weight tartaric acid, 2 parts by weight hydroxyethylcellulose and 8 parts by weight of a particulate ultra-fine hydraulic cement having a maximum particle size of about 15 microns and a specific surface area of about 12,000 square centimeters per gram. The additive was mixed with the cement slurries tested in the amounts indicated in Table I below. In a number of the tests, the cement slurry was tested with and without the additive of this invention. In order of the tests, a conventional set retarding agent was substituted for the universal additive of this invention or included in the cement slurry with the universal additive. Also, fumed silica was included in some of the cement slurries tested.

The results of these tests are given in Table I below.

TABLE I

Properties Of Cement Slurries Containing Universal Cement Additive

| Test No. | Cement In The Slurry Tested, Country, Manufacturer and API Class | Water In Slurry, % by Weight of Cement | Universal Additive, % by Weight of Cement | Set Retarder, % by Weight of Cement | Fumed Silica, % by Weight of Cement | Slurry Density, Pounds Per Gallon | Thickening Time, Hrs:Min 140° F. | 180° F. | 250° F. | Fluid Loss at 140° F., cc/30 min | PV/YP 80° F. | 140° F. | 140° F. Time to 50 psi, hr:min | Time to 500 psi, hr:min | 24 hr | 180° F. Time to 50 psi, hr:min | Time to 50 psi, hr:min | 24 hr | 250° F. Time to 50 psi, hr:min | Time to 500 psi, hr:min | 24 hr |
|---|---|---|---|---|---|---|---|---|---|---|---|---|---|---|---|---|---|---|---|---|---|
| 1 | Nigeria Eagle G | 44 | — | — | — | 15.9 | 0:52 | — | — | 1907 | 39/27 | 54/71 | 1:21 | 2:02 | 3073 | — | — | — | — | — | — |
| 2 | Nigeria Eagle G | 44 | 1.5 | — | — | 15.9 | 1:07 | — | — | 450 | 60/8 | 57/50 | 1:12 | 2:40 | 3185 | — | — | — | — | — | — |
| 3 | Bolivia Warnes A | 46 | — | — | — | 15.6 | 0:55 | — | — | 1950 | 51/78 | — | 1:59 | 3:16 | 2030 | — | — | — | — | — | — |
| 4 | Bolivia Warnes A | 46 | 1.5 | — | — | 15.6 | 1:21 | — | — | 477 | 65/30 | 48/28 | 3:22 | 5:39 | 2108 | — | — | — | — | — | — |
| 5 | India Kujang G | 44 | — | — | — | 15.9 | 1:10 | — | — | 1900 | 30/22 | 57/11 | 1:40 | 2:54 | 2816 | — | — | — | — | — | — |
| 6 | India Kujang G | 44 | 1.5 | — | — | 15.9 | 1:13 | — | — | 600 | 44/10 | 39/16 | 1:56 | 2:55 | 3123 | — | — | — | — | — | — |
| 7 | Bolivia Warnes A | 46 | — | 0.5[2] | — | 15.6 | — | 2:22 | — | — | — | — | — | — | — | 6:46 | 7:57 | 2079 | — | — | — |
| 8 | Bolivia Warnes A | 46 | 1.5 | 0.5[2] | — | 15.6 | — | 6:06 | — | — | — | — | — | — | — | 19:00 | 22:44 | 574 | — | — | — |
| 9 | India Kujang G | 56 | — | 0.65[3] | 35 | 15.8 | — | — | 4:28 | — | — | — | — | — | — | — | — | — | 4:22 | 5:00 | 2628 |
| 10 | India Kujang G | 56 | 1.5 | 0.65[3] | 35 | 15.8 | — | — | 2:16 | — | — | — | — | — | — | — | — | — | 4:31 | 5:05 | 2526 |
| 11 | USA Capital H | 48.6 | — | 0.65[3] | 35 | 16.4 | — | — | 7:50 | — | — | — | — | — | — | — | — | — | 16:09 | 18:43 | 1481 |
| 12 | USA Capital H | 48.6 | 1.3 | 0.65[3] | 35 | 16.4 | — | — | 2:59 | — | — | — | — | — | — | — | — | — | 1:25 | 5:20 | 2512 |
| 13 | Baturaja A | 58.2 | — | 0.65[3] | 35 | 15.6 | — | — | 4:44 | — | — | — | — | — | — | — | — | — | 8:47 | 10:35 | 2173 |
| 14 | Baturaja A | 58.2 | 1.5 | 0.65[3] | 35 | 15.6 | — | — | 3:17 | — | — | — | — | — | — | — | — | — | 6:01 | 6:41 | 2621 |
| 15 | Baturaja A | 53.7 | 5.18[1] | 0.65[3] | 35 | 15.6 | — | — | 2:56 | — | — | — | — | — | — | — | — | — | 1:42 | 4:41 | 2429 |
| 16 | USA Capital H | 39.1 | — | 0.5[3] | — | 16.4 | — | 5:50 | — | — | — | — | — | — | — | 14:03 | 15:20 | 1455 | — | — | — |
| 17 | USA Capital H | 39.1 | 1.5 | 0.5[2] | — | 16.4 | — | 8:44 | — | — | — | — | — | — | — | 14:00 | 18:23 | 1571 | — | — | — |
| 18 | India Kujang G | 44.8 | — | 0.5[2] | — | 15.8 | — | 3:23 | — | — | — | — | — | — | — | 4:51 | 5:55 | 2800 | — | — | — |
| 19 | India Kujang G | 44.8 | 1.5 | 0.5[2] | — | 15.8 | — | 4:21 | — | — | — | — | — | — | — | 9:38 | 11:22 | 2543 | — | — | — |
| 20 | Baturaja A | 46.3 | — | 0.5[2] | — | 15.6 | — | 3:38 | — | — | — | — | — | — | — | 7:37 | 8:58 | 2200 | — | — | — |
| 21 | Baturaja A | 46.3 | 1.5 | 0.5[2] | — | 15.6 | — | 6:12 | — | — | — | — | — | — | — | 14:10 | 16:32 | 1866 | — | — | — |
| 22 | Baturaja A | 42.3 | 5.18[1] | 0.5[2] | — | 15.6 | — | 13:20 | — | — | — | — | — | — | — | No Set | No Set | No Set | — | — | — |
| 23 | Baturaja A | 42.3 | 5.18[1] | 0.5[2] | — | 15.6 | — | 12:17 | — | — | — | — | — | — | — | 28:54 | 38:20 | — | — | — | — |
| 24 | Baturaja A | 53.7 | 5.18[1] | 0.65[3] | 35 | 15.6 | — | — | 5:12 | — | — | — | — | — | — | — | — | — | 7:52 | 8:53 | 2514 |

[1] Additive dissolved in ___ fresh water in an amount of ___ % by weight of solution
[2] Set retarder was sodium lignosulfonate
[3] Set retarder was calcium lignosulfonate From Table I, it can be seen that all of the various slurries tested which contained the additive of this invention had excellent properties and were suitable for oil and gas well cementing applications.

EXAMPLE 2

A variety of cement slurries having various densities and utilizing various API hydraulic cements, fresh water or salt water and various quantities of another universal additive of this invention were prepared. The slurries were tested for thickening time, fluid loss, rheology (plastic viscosity/yield point), compressive strengths and shear bond strengths at various temperatures. The tests were run in accordance with the procedures set forth in the *API Specification For Materials And Testing For Well Cements*, API Specification 10, 5th Edition, dated Jul. 1, 1990, of the American Petroleum Institute.

The universal additive utilized in the tests was comprised of 10 parts by weight ferric chloride, 14 parts by weight calcium chloride, 0.3 parts by weight tartaric acid, 12 parts by weight hydroxyethylcellulose, 0.3 parts by weight of a polydimethylsiloxane defoaming agent, 11 parts by weight of a dispersing agent comprised of the condensation product of acetone, formaldehyde and sodium sulfite, 8 parts by weight of a particulate ultra-fine hydraulic cement having a maximum particle size of about 15 microns and a specific surface area of about 12,000 square centimeters per gram, 8 parts by weight of ASTM Type III cement (commercially available, for example from Texas Industries of Midlothian, Tex.) and 8 parts by weight of fumed silica. The additive was mixed with the cement slurries tested in the amounts indicated in Table II below.

The results of these tests are given in Table II below.

TABLE II

Properties Of Cement Slurries Containing Universal Additive

| Test No. | Cement In The Slurry Tested, Manufacturer and API Class | Water In Slurry, % by Weight of Cement | Universal Additive, % By Weight of Cement | Slurry Density, Pounds Per Gallon | Thickening Time, Hrs:Min 100° F. | Thickening Time, Hrs:Min 140° F. | Fluid Loss, CC/30 Min 80° F. | Fluid Loss, CC/30 Min 140° F. | PV/YP 800° F. | PV/YP 140° F. | 24 Hr Compressive Strength, psi 100° F. | 24 Hr Compressive Strength, psi 140° F. | 48 Hr Compressive Strength, psi 100° F. | 48 Hr Compressive Strength, psi 140° F. | 140° F. Shear Bond Strength, psi 7 days | 140° F. Shear Bond Strength, psi 48 hrs |
|---|---|---|---|---|---|---|---|---|---|---|---|---|---|---|---|---|
| 1 | Capital H | 54.53 | 4 | 15 | — | 3:33 | 0 | 210 | 144/39 | 107/21 | 770 | 91 | 1895 | 2140 | — | — |
| 2 | Capital H | 100.3 | 11 | 12.8 | 13:12 | — | 0 | 64 | 125/25 | 117/18 | 0 | 0 | 425 | 398 | — | — |
| 3 | Fredonia H | 54.53 | 4 | 15 | — | 4:40 | 0 | 267 | 168/31 | 119/36 | 949 | 2810 | 3020 | 3720 | — | — |
| 4 | Fredonia H | 100.3 | 11 | 12.8 | 18:00 | — | 0 | 91 | 125/25 | 102/23 | 0 | 88 | 662 | 1055 | — | — |
| 5 | Lone Star H | 54.53 | 4 | 15 | — | 4:00 | 0 | 240 | 122/28 | 116/22 | 1051 | 860 | 2130 | 1656 | 193 | 273 |
| 6 | Lone Star H | 100.3 | 11 | 12.8 | 13:30 | — | 0 | 72 | 107/18 | 85/15 | 0 | 0 | 709 | 566 | 119 | 178 |
| 7 | Capital A | 59.5 | 4.5 | 14.6 | — | 2:22 | 0 | 266 | 138/47 | 95/30 | 2540 | 3100 | 3780 | 4170 | — | — |
| 8 | Capital A | 100.3 | 11 | 12.8 | 6:20 | — | 0 | 82 | 117/28 | 117/28 | 554 | 906 | 975 | 1378 | — | — |
| 9 | Blue Circle A | 59.5 | 4.5 | 14.6 | — | 2:55 | 0 | 160 | 131/50 | 120/68 | 2000 | 3250 | .3810 | 4490 | — | — |
| 10 | Blue Circle A | 100.3 | 11 | 12.8 | 10:10 | — | 0 | 76 | 113/22 | 165/35 | 250 | 425 | 856 | 1050 | — | — |
| 11 | TX. Lehigh A | 59.5 | 4.5 | 14.6 | — | 2:10 | 0 | 196 | 114/21 | 72/18 | 2280 | 3060 | 2430 | 2270 | 336 | 433 |
| 12 | TX. Lehigh A | 100.3 | 11 | 12.8 | 8:22 | — | 0 | 42 | 129/24 | 79/16 | 416 | 634 | 770 | 1086 | 148 | 183 |
| 13 | Lone Star A | 59.5 | 4.5 | 14.6 | — | 2:20 | 0 | 231 | 108/44 | 98/37 | 1858 | 3210 | 3670 | 4020 | — | — |
| 14 | Lone Star A | 100.3 | 11 | 12.8 | 9:00 | — | 0 | 64 | 156/33 | 153/30 | 412 | 528 | 924 | 1206 | — | — |
| 15 | Ekshaw G | 57.25 | 4.25 | 14.8 | — | 2:40 | 0 | 194 | 113/44 | 111/42 | 1920 | 2910 | 3460 | 4060 | — | — |
| 16 | Ekshaw G | 100.3 | 11 | 12.8 | 14:00 | — | 0 | 68 | 128/22 | 128/22 | 25 | 13 | 704 | 900 | — | — |
| 17 | Dykerhoff G | 57.25 | 4.25 | 14.8 | — | 3:20 | 0 | 300 | 116/18 | 77/20 | 2140 | 2670 | 3220 | 3510 | — | — |
| 18 | Dykerhoff G | 100.3 | 11 | 12.8 | 12:59 | — | 0 | 80 | 102/20 | 81/17 | 203 | 11 | 575 | 944 | — | — |
| 19 | Bolivja G#4 | 57.25 | 4.25 | 14.8 | — | 3:40 | 0 | 250 | 137/21 | 110/20 | 1326 | 2730 | 3100 | 4600 | — | — |
| 20 | Bolivia G#4 | 100.3 | 11 | 12.8 | 13:50 | — | 0 | 44 | 111/16 | 90/8 | 0 | 0 | 641 | 1026 | — | — |

From Table II it can be seen that all of the various slurries tested had excellent properties and were suitable for oil and gas well cementing applications.

EXAMPLE 3

The tests described above were repeated utilizing five cement slurries at two different densities with and without the universal additive of this invention. The results of these tests are given in Table III below.

TABLE III

Properties Of Cement Slurries With And Without Universal Additive

| Test No. | Cement In The Slurry Tested, Manufacturer and API Class | Water in Slurry, % by Weight Cement | Universal Additive % by Weight of Cement | Slurry Density, Pounds Per Gallon | Thickening Time, Hrs:Min 100° F. | Thickening Time, Hrs:Min 140° F. | 140° F. Fluid Loss CC/ 30 Min | PV/YP 80° F. | PV/YP 140° F. | 24 Hr Compressive Strength, psi 100° F. | 24 Hr Compressive Strength, psi 140° F. | 48 Hr Compressive Strength, psi 100° F. | 48 Hr Compressive Strength, psi 140° F. |
|---|---|---|---|---|---|---|---|---|---|---|---|---|---|
| 1 | Capital H | 100.3 | 11 | 12.8 | 13:12 | — | 64 | 125/25 | 117/18 | 0 | 0 | 425 | 398 |
| 2 | Capital H | 54.3 | 4 | 15 | — | 3:33 | 210 | 144/39 | 107/21 | 770 | 931 | 1895 | 2140 |
| 3 | TX. Lehigh A | 100.3 | 11 | 12.8 | 8:22 | — | 42 | 129/24 | 79/16 | 416 | 634 | 770 | 1086 |
| 4 | TX. Lehigh A | 59.3 | 4.5 | 14.6 | — | 2:10 | 196 | 114/21 | 72/18 | 2280 | 3060 | 2430 | 2270 |
| 5 | Ekshaw G | 100.3 | 11 | 12.8 | 14:00 | — | 68 | 128/22 | 128/22 | 25 | 13 | 704 | 800 |
| 6 | Ekshaw G | 57.25 | 4.25 | 14.8 | — | 2:40 | 194 | 113/44 | 111/42 | 1920 | 2910 | 3460 | 4060 |
| 7 | TXI Type I/II[1] | 100.3 | 11 | 12.8 | 7:47 | — | 98 | 132/28 | 125/22 | 332 | 110 | 819 | 1025 |
| 8 | TXI Type I/II[1] | 59.4 | 4.5 | 14.6 | — | 2:03 | 216 | 123/32 | 114/42 | 1857 | 2830 | 2720 | 3990 |
| 9 | TOPPA Type I/II[1] | 100.3 | 11 | 12.8 | 8:40 | — | 68 | 140/28 | 95/16 | 547 | 664 | 861 | 991 |
| 10 | TOPPA Type I/II[1] | 59.4 | 4.5 | 14.6 | — | 2:13 | 216 | 114/30 | 68/19 | 2120 | 2970 | 3040 | 3860 |
| 11 | Capital H | 96.43 | 0 | 12.8 | 24+ | — | 1905 | 4.5/1.5 | 3.75/1.75 | Settled by 40% | | — | — |
| 12 | Capital H | 54.5 | 0 | 15 | — | 3:05 | 1943 | 14.5/7.5 | 10.5/14.5 | 1065 | 1943 | 1718 | 2940 |
| 13 | TX. Lehigh A | 96.43 | 0 | 12.8 | 24+ | — | 1475 | 4.5/1.5 | 4.5/1.5 | Settled by 50% | | — | — |
| 14 | TX. Lehigh A | 59.74 | 0 | 14.6 | — | 1:29 | 1748 | 13.5/5.5 | 10.5/7.5 | 1769 | 2160 | 2450 | 2700 |
| 15 | Exshsw G | 96.43 | 0 | 12.8 | 24+ | — | 1750 | 4.5/1.5 | 3.75/1.75 | Settled by 20% | | — | — |
| 16 | Exshaw G | 59.63 | 0 | 14.8 | — | 4:04 | 1896 | 16.5/10.5 | 13.5/16.5 | 1401 | 2230 | 1769 | 2620 |
| 17 | TXI Type I/II[1] | 96.43 | 0 | 12.8 | 23:45 | — | 1825 | 6/2 | 4.5/2.5 | Settled by 30% | | — | — |
| 18 | TXI Type I/II[1] | 59 | 0 | 14.6 | — | 2:10 | 1710 | 12/10 | 17/17 | 1790 | 2820 | 2460 | 2530 |
| 19 | TOPPA Type I/II[1] | 96.43 | 0 | 12.8 | 22:30 | — | 1610 | 6/3 | 3/5 | Settled by 20% | | — | — |
| 20 | TOPPA Type I/II[1] | 59 | 0 | 14.6 | — | 1:45 | 1585 | 12/8 | 14/10 | 1646 | 2030 | 2260 | 2800 |

[1]Construction grade cements

From Table III it can be seen that the presence of the universal additive of this invention in the various cement slurries tested significantly improved the properties of the cement slurries.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A universal additive for improving the properties of a cement slurry to be utilized for cementing a well comprising:

ferrous chloride, ferric chloride or mixtures thereof present in an amount in the range of from about 0.5 to about 30 parts by weight;

an effective amount of a dispersing agent which controls the rheology of the cement slurry;

an effective amount of an organic acid which controls the viscosity of the cement slurry;

an effective amount of a hydratable polymer which increases the viscosity of the cement slurry; and an ultra-fine particulate hydraulic cement having a maximum particle size of about 15 microns and a specific surface of about 12,000 square centimeters per gram present in an amount in the range of from about 1 to about 50 parts by weight.

2. The additive of claim 1 wherein said dispersing agent is comprised of a condensation polymer product of an aliphatic ketone, an aliphatic aldehyde and a compound which introduces acid groups into the condensation polymer.

3. The additive of claim 1 wherein said organic acid is tartaric acid, citric acid, gluconic acid, oleic acid, phosphoric acid or uric acid.

4. The additive of claim 1 wherein said hydratable polymer is carboxymethylcellulose, hydroxyethylcellulose, carboxymethylhydroxyethylcellulose, or vinyl sulfonate polymers.

5. The additive of claim 1 which further comprises a polydimethylsiloxane defoaming agent present in said additive in an amount in the range of from about 0.01 to about 5 parts by weight.

6. The additive of claim 1 which further comprises an alkali or alkaline-earth metal halide present in said additive in an amount in the range of from about 5 to about 20 parts by weight.

7. The additive of claim 1 which in addition comprises a particulate ASTM Type III cement present in said additive in an amount in the range of from about 1 to about 50 parts by weight.

8. The additive of claim 1 which further comprises particulate silica present in said additive in an amount in the range of from about 1 to about 50 parts by weight.

9. The additive of claim 1 wherein said dispersing agent is present in an amount in the range of from about 1 to about 20 parts by weight.

10. The additive of claim 1 wherein said organic acid is present in an amount in the range of from about 0.01 to about 10 parts by weight.

11. The additive of claim 1 wherein said hydratable polymer is present in an amount in the range of from about 1 to about 20 parts by weight.

12. The additive of claim 1 wherein said dispersing agent is present in an amount in the range of from about 1 to about 20 parts by weight, said organic acid is present in an amount in the range of from about 0.01 to about 10 parts by weight and said hydratable polymer is present in an amount in the range of from about 1 to about 20 parts by weight.

13. The additive of claim 1 wherein said hydratable polymer comprises a hydratable graft polymer.

14. A universal particulate solid additive for improving the properties of a cement slurry to be utilized for cementing a well comprising:

ferrous chloride, ferric chloride or mixtures thereof present in an amount of about 10 parts by weight;

a condensation polymer product of acetone, formaldehyde and sodium sulfite present in an amount of about 13 parts by weight;

tartaric acid present in an amount of about 0.4 parts by weight;

hydroxyethylcellulose present in an amount of about 2 parts by weight; and a particulate ultra-fine hydraulic cement having a maximum particle size of about 15 microns and a specific surface of about 12,000 square centimeters per gram present in an amount of about 8 parts by weight.

15. The additive of claim 14 which further comprises:

polydimethylsiloxane present in an amount of about 0.3 parts by weight;

calcium chloride present in an amount of about 14 parts by weight;

a particulate ASTM Type III cement present in an amount of about 8 parts by weight; and fumed silica present in an amount of about 8 parts by weight.

16. A method of preparing a cement slurry for cementing oil and gas wells which comprises:

combining a universal additive with said cement slurry in an amount in the range of from about 0.1% to about 30% by weight of said hydraulic cement in said slurry, said additive comprising ferrous chloride, ferric chloride or mixtures thereof present therein in an amount in the range of from about 0.5 to about 30 parts by weight, an effective amount of a dispersing agent which controls the rheology of the cement slurry, an effective amount of an organic acid which controls the viscosity of the cement slurry, an effective amount of a hydratable polymer which increases the viscosity of the cement slurry and an ultra-fine particulate hydraulic cement present in said additive in an amount in the range of from about 1 to about 50 by weight.

17. The method of claim 16 wherein said dispersing agent in said additive is a condensation polymer product of acetone, formaldehyde and sodium sulfite and is present in an amount in the range of from about 1 to about 20 parts by weight.

18. The method of claim 16 wherein said organic acid in said additive is tartaric acid present in an amount in the range of from about 0.1 to about 10 parts by weight.

19. The method of claim 16 wherein said hydratable polymer in said additive is hydroxyethylcellulose present in an amount in the range of from about 1 to about 20 parts by weight.

20. The method of claim 16 wherein said ultra-fine particulate hydraulic cement has a maximum particle size of about 15 microns and a specific surface of about 12,000 square centimeters per gram.

21. The method of claim 16 wherein said additive further comprises a defoaming agent comprised of polydimethylsiloxane present in said additive in an amount in the range of from about 0.01 to about 5 parts by weight.

22. The method of claim 16 wherein said additive further comprises an alkali or alkaline-earth metal chloride present in said additive in an amount in the range of from about 5 to about 20 parts by weight.

23. The method of claim 16 wherein said additive in addition comprises an ASTM Type III particulate cement present in said additive in an amount in the range of from about 1 to about 50 parts by weight.

24. The method of claim 16 wherein said additive further comprises fumed silica present in said additive in an amount in the range of from about 1 to about 50 parts by weight.

25. The method of claim 16 wherein said hydratable polymer comprises a hydratable graft polymer.

26. A method of cementing a subterranean zone penetrated by a well bore at a temperature up to about 230° F. utilizing a cement slurry comprised of a surface construction grade or better hydraulic cement and water having a density in the range of from about 12 to about 17 pounds per gallon comprising the steps of:

(a) combining a universal additive with said cement slurry in an amount in the range of from about 0.1% to about 30% by weight of said hydraulic cement in said slurry, said additive comprising ferrous chloride, ferric chloride or mixtures thereof present therein in an amount in the range of from about 0.5 to about 30 parts by weight, an effective amount of a dispersing agent which controls the rheology of the cement slurry, an effective amount of an organic acid which controls the viscosity of the cement slurry, an effective amount of a hydratable polymer which increases the viscosity of the cement slurry and an ultra-fine particulate hydraulic cement present in said additive in an amount in the range of from about 1 to about 50 by weight;

(b) pumping the cement slurry containing said additive formed in step (a) into said subterranean zone by way of said well bore; and (c) allowing said cement slurry to set into a hard impermeable mass in said zone.

27. The method of claim 26 wherein said dispersing agent in said additive is a condensation polymer product of acetone, formaldehyde and sodium sulfite and is present in an amount in the range of from about 1 to about 20 parts by weight.

28. The method of claim 26 wherein said organic acid in said additive is tartaric acid present in an amount in the range of from about 0.01 to about 10 parts by weight.

29. The method of claim 21 wherein said hydratable polymer in said additive is hydroxyethylcellulose present in said additive in an amount in the range of from about 1 to about 20 parts by weight.

30. The method of claim 26 wherein said ultra-fine particulate hydraulic cement has a maximum particle size of about 15 microns and a specific surface of about 12,000 square centimeters per gram.

31. The method of claim 26 wherein said additive further includes a defoaming agent comprised of polydimethylsiloxane present in said additive in an amount in the range of from about 0.01 to about 5 parts by weight.

32. The method of claim 26 wherein said additive further includes an alkali or alkaline metal chloride present in said additive in an amount in the range of from about 5 to about 20 parts by weight.

33. The method of claim 26 wherein said additive in addition comprises an ASTM Type III particulate cement present in said additive in an amount in the range of from about 1 to about 50 parts by weight.

34. The method of claim 26 wherein said additive further includes fumed silica present in said additive in an amount in the range of from about 1 to about 50 parts by weight.

* * * * *